(12) United States Patent
Ayyagari

(10) Patent No.: US 7,342,896 B2
(45) Date of Patent: Mar. 11, 2008

(54) CENTRALIZED NETWORK ORGANIZATION AND TOPOLOGY DISCOVER IN AD-HOC NETWORK WITH CENTRAL CONTROLLER

(75) Inventor: Deepak V. Ayyagari, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 845 days.

(21) Appl. No.: 10/775,717

(22) Filed: Feb. 9, 2004

(65) Prior Publication Data

US 2004/0174829 A1   Sep. 9, 2004

Related U.S. Application Data

(60) Provisional application No. 60/451,474, filed on Mar. 3, 2003.

(51) Int. Cl.
*H04L 12/26*   (2006.01)
(52) U.S. Cl. .................................... 370/254; 370/255
(58) Field of Classification Search .................. None
See application file for complete search history.

(56) References Cited

U.S. PATENT DOCUMENTS

| | | | |
|---|---|---|---|
| 6,212,587 B1 * | 4/2001 | Emerson et al. | 710/107 |
| 6,483,812 B1 | 11/2002 | Prorock | |
| 6,937,602 B2 * | 8/2005 | Whitehill et al. | 370/395.54 |
| 2001/0029166 A1 | 10/2001 | Rune et al. | |
| 2002/0044533 A1 | 4/2002 | Bahl et al. | |
| 2002/0044549 A1 * | 4/2002 | Johansson et al. | 370/386 |
| 2007/0097885 A1 * | 5/2007 | Traversat et al. | 370/254 |

FOREIGN PATENT DOCUMENTS

| | | |
|---|---|---|
| EP | 1 107 522 A1 | 6/2001 |
| WO | WO 02/087172 A1 | 10/2002 |

OTHER PUBLICATIONS

IEEE802.15.3 Standard—(extract).

* cited by examiner

*Primary Examiner*—Phirin Sam
(74) *Attorney, Agent, or Firm*—Jon M. Dickinson, PC; Robert D. Varitz, PC

(57) ABSTRACT

A method for the self-organization of a plural-node communication network which involves (1) selecting a central coordinator (CCo) node from a collection of nodes initially lacking a CCo, (2) employing the selected CCo to oversee a procedure for discovering, from the mentioned node collection, all nodes which are optimally capable of being organized into a network, in the sense that all such discovered, capable nodes may effectively be organized to communicate bidirectionally with all other nodes, and (3), with respect to such discovered, organizable nodes, creating a network-global connectivity database in the form of a network-organizing communication topology table that describes enablement of bidirectional communication between all nodes. The discovering process includes discovering both non-hidden and hidden nodes, and identifying suitable proxy nodes which are non-hidden nodes, and which may effectively stand as intermediaries for enabling bidirectional communications between these otherwise hidden nodes and all other nodes, including, of course, the CCo.

14 Claims, 5 Drawing Sheets

| DISCOVERY_MSG |
|---|
| Source MAC Address/TEI (6 bytes) |
| Device Class (1 byte) |
| Activity Indicator (Optional) (1 byte) |
| Number of Contention Intervals (CI) (1 byte) |
| Frame Number of CI -1 (1 byte) |
| Slot Number of CI-1 (1 byte) |
| • • • |
| Frame Number of CI-N (1 bytes) |
| Slot Number of CI-N (1 byte) |

Fig. 5

| DISCOVERY_MSG |
|---|
| Source MAC Address/TEI (6 bytes) |
| Device Class (1 byte) |

Fig. 6

| CCo_DISC_NODE_LIST_MSG |
|---|
| Source MAC Address/TEI (6 bytes) |
| Device Class Present Field (1 byte) |
| Number of Nodes Discovered (1 byte) |
| MAC Address of Discovered Node #1 (6 bytes) |
| Device Class of Node #1 (1 byte) |
| • • • |
| MAC Address of Discovered Node #N (6 bytes) |
| Device Class of Node # N |

Fig. 7

| |
|---|
| CCo_NETCONFIG_MSG |
| Source MAC Address of CCo (6 bytes) |
| Device Class of New CCo (1 byte) |
| Number of Proxy Nodes (1 byte) |
| MAC Address of Proxy Node #1 |
| Number of Hidden Nodes(N) (1 byte) |
| MAC Address of Hidden Node #1 |
| • • |
| MAC Address of Hidden Node #N |
| MAC Address of Proxy Node #2 |
| Number of Hidden Nodes(N) (1 byte) |
| MAC Address of Hidden Node #1 |
| • • |
| MAC Address of Hidden Node #N |
| • • |
| MAC Address of Proxy Node #N |
| • • |

Fig. 8

| |
|---|
| CCo_NETCONFIG_MSG_SHORT |
| CCo Source MAC Address (6 bytes) |
| CCo Device Class (1 byte) |

Fig. 9

| Topology Table for CCo (Node A) | | | | | | |
|---|---|---|---|---|---|---|
| NODES | Device Class (optional) | DISCOVERED NODE LISTS -> | | | | |
| A | | A | B | C | | |
| B | | A | B | C (X) | | |
| C | | A | B | C | D | E |
| Hidden Nodes (associated nodes) | Device Class (optional | | | | | |
| D | | | | C | D | E |
| E | | | | C | D | E |

Fig. 10

| Order | Criteria | Note |
|---|---|---|
| 1 | Device Class/ Device Capability | Dev Can be CCo or Not |
| 2 | Number of Discovered nodes in DISCOVERED_NODE_LIST | Higher is preferred |
| 3 | Capacity or MAX PHY Transmission Speed | Higher is preferred |
| 4 | Duty Cycle ( Fraction of time device is busy) | Lower is preferred |
| 5 | Other (vendor defined) | |

Fig. 11

CENTRALIZED NETWORK ORGANIZATION AND TOPOLOGY DISCOVER IN AD-HOC NETWORK WITH CENTRAL CONTROLLER

CROSS-REFERENCE TO RELATED APPLICATION

This application claims the priority filing date, Mar. 3, 2003, of currently co-pending U.S. Provisional Patent Application Ser. No. 60/451,474, filed by the same inventor as the inventor in this case, for "Network Organization, Topology Discovery, and Selection of Central Coordinator in an Ad-Hoc Network with Centralized Control". The contents of that provisional application are hereby incorporated herein by reference.

BACKGROUND AND SUMMARY OF THE INVENTION

This invention pertains to multi-nodal communication network organization, and more particularly to unique procedures whereby a network, having initially no defined central controller, or coordinator, (CCo) can self-organize in a way which involves nodal discovery, followed by organization which leads to (a) selection, ultimately, of the most suited node to be the CCo, (b) selection of the optimal collection of nodes to define the active network, (c) definition of network topology in terms of both non-hidden (NHN) and hidden (HN) nodes, and (d) the effective establishment of satisfactory connectivity between all of the active network nodes, including the establishment of intermediary proxy nodes which act as surrogates for the determined CCo to facilitate communication between HNs and the CCo. Connections between nodes for communication take place through a suitable medium, or channel, which may be either wired or wireless.

In the description herein of the present invention, the term "topology" is used. Topology relates to knowledge regarding (a) the identities of all nodes in a network, (b) the states of connectivity between nodes, (c) the identity of the eventually selected CCo, (d) the identities of so-called hidden nodes (defined below), and (e) the identity of what is referred to herein (later explained) as a proxy node.

In self-organizing ad-hoc communication networks which are, or are to be, centrally controlled, nodes need to learn about the presence of other nodes (devices) in the network, as well as about the availability of acceptable bi-directional links between any two nodes (topology discovery process). The nodes must be able to organize themselves into networks controlled by a suitable, selected Central Coordinator (CCo). This is required (a) any time a node joins or leaves the network, (b) during recovery from network or node failure, (c) when the network is initialized, and (d) when any event that changes the topology of the network occurs (i.e., CCo shuts down, better CCo is available in the network, link characteristics change, etc.). The process of network organization requires a protocol—and effective methodology—for the exchange of relevant information between devices (nodes), and for decision-making processes required to organize the network. As used herein, the term "network" refers to a collection of nodes which effectively can all "hear" one another. Side headings and lead-in topic phrases presented and featured in the text which now follows identify various activities, algorithmic characteristics and communication messages which collectively describe this invention.

The present invention, in its preferred and best mode form, proposes unique Centralized Network Organization and Topology Discovery Algorithms (CNOA). These algorithms address the following matters:

1. Device Network Entry (SCAN and ASSOCIATE): Such procedures are required to describe how a device may join a network that has already been established. The impact of a new device joining the network must also be addressed by these procedures.

2. Discovery of Network Topology: This is a process by which nodes learn of each other's presence, of device capabilities, and of the qualities of communications links between them. At the end of this process, the CCo has a global knowledge of the network link characteristics, and proceeds to build a global connectivity database called the TOPOLOGY TABLE.

3. Establishment of an ad-hoc Network (identification of all nodes that belong to the "network": The "network" is defined as a logical association of nodes that can all communicate with one another. The CCo needs to determine this collection of nodes.

4. Identification of a Central Coordinator (CCo): This function determines which device in the network is most suited to fulfill the role of CCo for the network.

5. Identification of Hidden Nodes (HN): This function identifies those nodes called "hidden nodes", which cannot communicate directly with the CCo, but may be able to communicate with other nodes in the network.

6. Identification of Proxy Coordinators (PCos) to service "hidden nodes": This function allows the CCo to identify nodes that can perform the function of PCos. PCos act as CCo surrogates, and allow the CCo to communicate with HNs. These PCo nodes are also referred to herein as proxy nodes.

CNOA Assumes the Following Attributes:

1. A CCo is always present in the network. If one is not present, the first node to join the network declares itself to be the CCo.

2. The CCo controls access to the medium (channel) by designating a time frame, and, utilizing any appropriate approach, by scheduling access for each node within each time frame as required by the node. Each time frame is delineated by the transmission of a BEACON_MSG message.

3. There exists at least one interval in each time frame (or one in several time frames) dedicated to contention access where communication-medium access is based on a contention-based algorithm, such as Slotted ALOHA. Any node may use this interval to communicate with the CCo, or with a proxy node.

Certain unique aspects of CNOA include:

1. An approach whereby the CCo schedules bandwidth allocations to be used by individual nodes for the transmission of discover messages. Other nodes listen to transmissions, and generate individual connectivity lists which are relayed back to the CCo. The CCo then generates a global connectivity graph for the network, called a TOPOLOGY TABLE.

This approach is unique in many ways. Usually, ad-hoc networks do not maintain global network connectivity information. The present invention enables the efficient generation and collection of network-wide connectivity information. Every node learns of its connectivity with all other nodes in one step. Nodes do not have to "probe" individual links on an ad-hoc basis as some prior art approaches require. Further, CNOA enables the identification of HNs, and allows these HNs to communicate with the CCo via intermediary nodes called, as mentioned earlier, proxy nodes. Practice of the invention makes it possible for HNs automatically to identify suitable proxy nodes with which to communicate. This then, allows HNs to join the network. It also uniquely allows HNs to participate in a discovery process for the whole network. No known prior art approach for ad-hoc networks provides these capabilities.

2. A methodology that identifies the optimal CCo; a methodology that identifies the optimal collection of nodes to constitute a network; a methodology that identifies HNs; and a methodology that identifies optimal PCos to connect HNs to the CCo and the network.

As will be seen, the present invention features a series of analyses that a CCo can perform on a TOPOLOGY TABLE which is generated at the end of the DISCOVERY process to accomplish all the above-listed functions. There is no known precedent in the prior art that allows a CCo optimally to select a node to fulfill the role of CCo, and to perform all of the other mentioned functions, in this manner. This approach of the invention is extremely efficient. It results in an optimal network configuration (i.e., best CCo device, best PCos, best network and hidden node configuration). Such an optimal configuration is determined with the least overhead in terms of message exchanges between nodes and CCo. It is also efficient in that the optimal configuration is generated and maintained in a minimal amount of time, or delay, incurred.

The CNOA algorithm describes the following functions: initial network establishment when no network exists, processes for devices joining and leaving the network, devices discovering or learning the topology of the network, identification of "hidden nodes", identification of proxy controllers to service hidden nodes, and selection of an optimal Central Coordinator from among all devices in the network. This algorithm defines procedures that enable hidden nodes to join the network. Topology discovery is the process by which individual nodes in a network (e.g., hosts, bridges, routers, etc.) learn the configuration of the network and the connectivity between any two individual nodes. This is important for network management, and for efficient routing and resource management. In the case of ad-hoc networks, the processes of discovery and network organization (how nodes organize themselves into clusters or sub-nets with designated subnet managers or controllers) are fundamental to the efficient operation of such networks.

Thus, and further explaining preliminarily, the present invention uniquely addresses topology, discovery and network organization, and other concomitant, issues and problems in an ad-hoc network with the following characteristics:

1. All nodes in a "network" share a common transmission medium (in both frequency and time domain). This medium may be wired or wireless. Multiple node access is provided. Nodes are not required to possess any "carrier sense" capability.

2. Connectivity between any two nodes is a function of the capabilities of such nodes, and of channel characteristics. Under the best transmission conditions for digital communications (power, modulation density, symbol duration, coding, etc.), all nodes do not necessarily hear all other nodes. Further, links between devices are not symmetric i.e., node A may hear (receive and correctly decode packets) from another node B, while B may not hear A.

3. The network in its operational mode, configured by practice of the present invention, consists of host nodes, a designated controller for the network called the Central Coordinator (CCo), and where appropriate, a set of Proxy Coordinators (PCo) to communicate with nodes that cannot directly communicate (in one link) with the CCo, or with other nodes in the network.

4. The network is self-organizing, in that the nodes have to establish the configuration of the network, and to choose a CCo. Such decision-making may be accomplished in a distributed fashion by each node making an independent decision, or by a central repository of relevant information. Network organization is required during initial network establishment, recovery from failures of hosts, PCos, CCos, when channel conditions between nodes change significantly causing outages, and when new nodes join or leave the network.

5. Once a network has been organized, the determined CCo controls the transmission activity of the nodes in the network. The existence of a CCo in the network implies:

(a) A timing reference which is available, allowing nodes in the network to synchronize to a universal time frame during which access is scheduled.

(b) Access to the medium/channel is scheduled by the CCo. Nodes are allowed to transmit only upon receiving explicit authorization either from the CCo or from a PCo. The CCo may also schedule time within a time frame for random access of the channel, during which all nodes are free to transmit as per the random access protocol agreed to by all nodes.

6. Nodes can directly communicate with one another, during time periods scheduled by the CCo, and do not have to use the CCo as an interim node or relay.

These and various other features and advantages which are offered by the present invention will become more fully apparent as the detailed description provided now below is read in conjunction with the illustrative drawings.

DESCRIPTION OF THE DRAWINGS

FIG. 5 illustrates a DISCOVERY message format.

FIG. 6 illustrates an abbreviated form of a DISCOVERY message.

FIG. 7 shows the format of a CCO_DISC_NODE_LIST_MSG message.

FIG. 8 illustrates a CCo_NETCONFIG_MSG message format

FIG. 9 presents a CCo_CONFIRM_MSG_SHORT message format.

FIG. 10 illustrates a created topology table for a five-node somewhat like that shown in FIG. 1.

FIG. 11 provides a table illustrating a representative order of preferences involved during practice of the present invention to select a CCo.

DETAILED DESCRIPTION OF THE INVENTION

Figure 1:
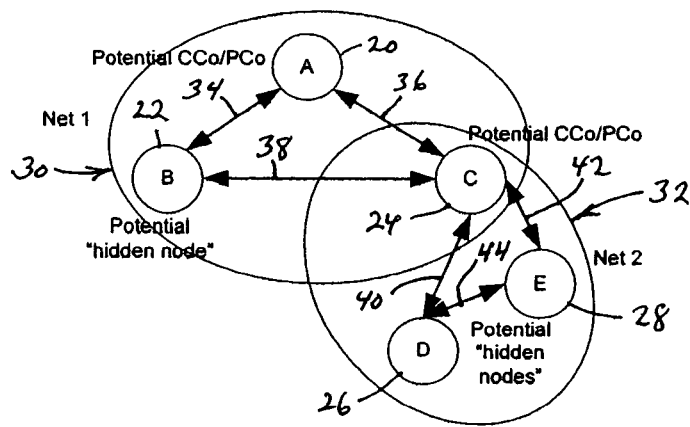
FIG. 1 is a high-level block/schematic diagram of a network topology including five nodes, and which has been created by practice of the preferred and best-mode forms of the present invention.

Turning attention now to the drawings, and beginning with FIG. 1, here five nodes 20, 22, 24, 26, 28, also referred to respectively by the letters A, B, C, D, E, are shown organized for illustration purposes, into two possible networks, or network topologies, 30, 32. Topologies 30, 32 are also referred to herein, respectively, also as Net 1 and Net 2. Viable interconnections which relate to these two illustrative organizations are shown at 34 (between A, B), 36 (between A, C), 38 (between B, C), 40 (between C, D), 42 (between C, E), and 44 (between D, E).

Looking now at these two network topologies, or configurations, and recognizing initially that any of the nodes could be the CCo, Net 1 (30) has node A as the CCo, B and C as hosts within the network, and C as a PCo for the hidden nodes D and E. Net 2 (32) has node C as the CCo, D and E as the hosts within the network, and C as a PCo for the hidden nodes A and B. A network with only A, B and C as host nodes and A as the CCo would leave nodes D and E unconnected. Network performance will be significantly different in the two configurations based, among several other factors, on the traffic load handled by nodes chosen as CCos, by the overhead of having a node function as a PCo (separate from a CCo), and if the quality (capacity) of links between the CCo and the nodes vary. In Net 2, C can act both as the CCo and the PCo, and can directly communicate with all four other nodes. In Net 1, A as the CCo can only communicate directly with two other nodes (B and C), and needs a proxy to handle nodes D and E. Therefore, the network organization algorithm and protocol are critical to the providing of connectivity, or networking, of all the nodes in the system, and for efficient network performance with low overhead. The present invention, as has been mentioned involves the use of a centralized network organization algorithm (CNOA).

Figure 2:
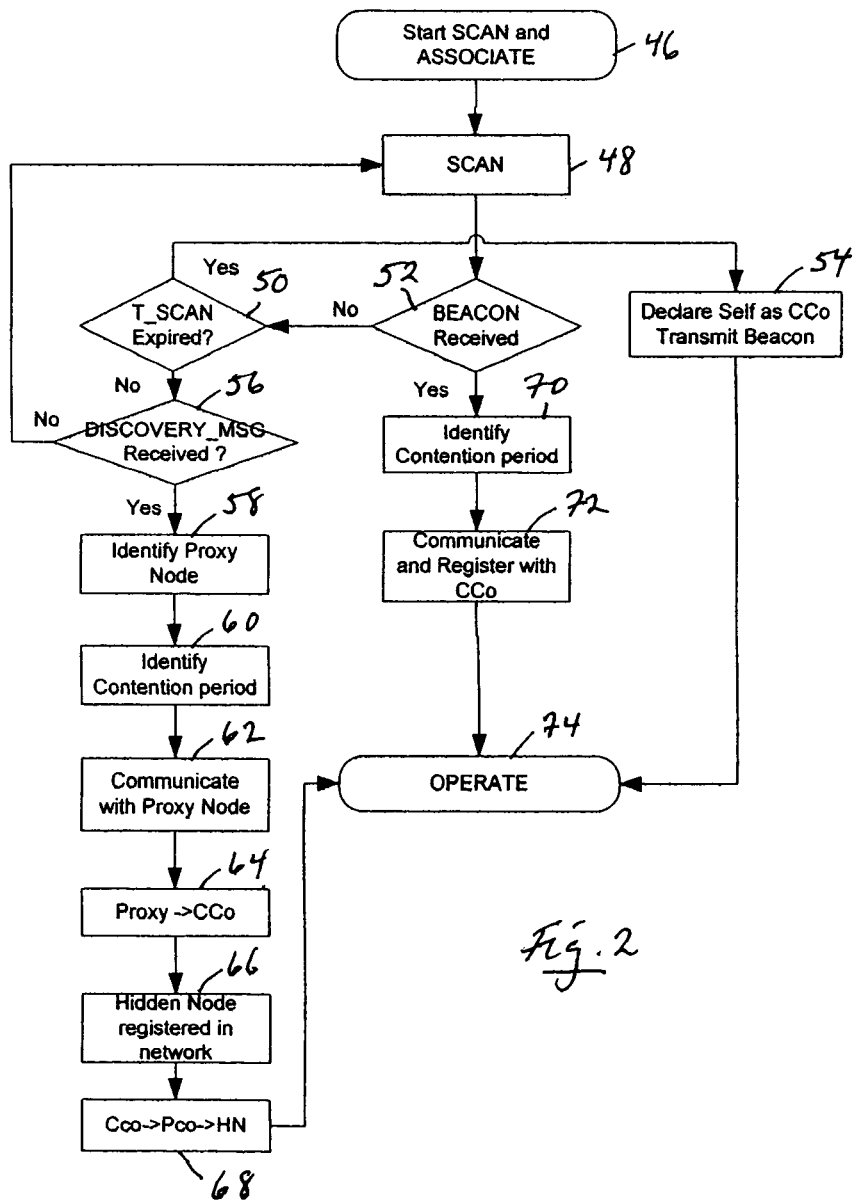
FIG. 2 is a block/schematic diagram illustrating SCAN and ASSOCIATE practices of the invention.
Figure 3:
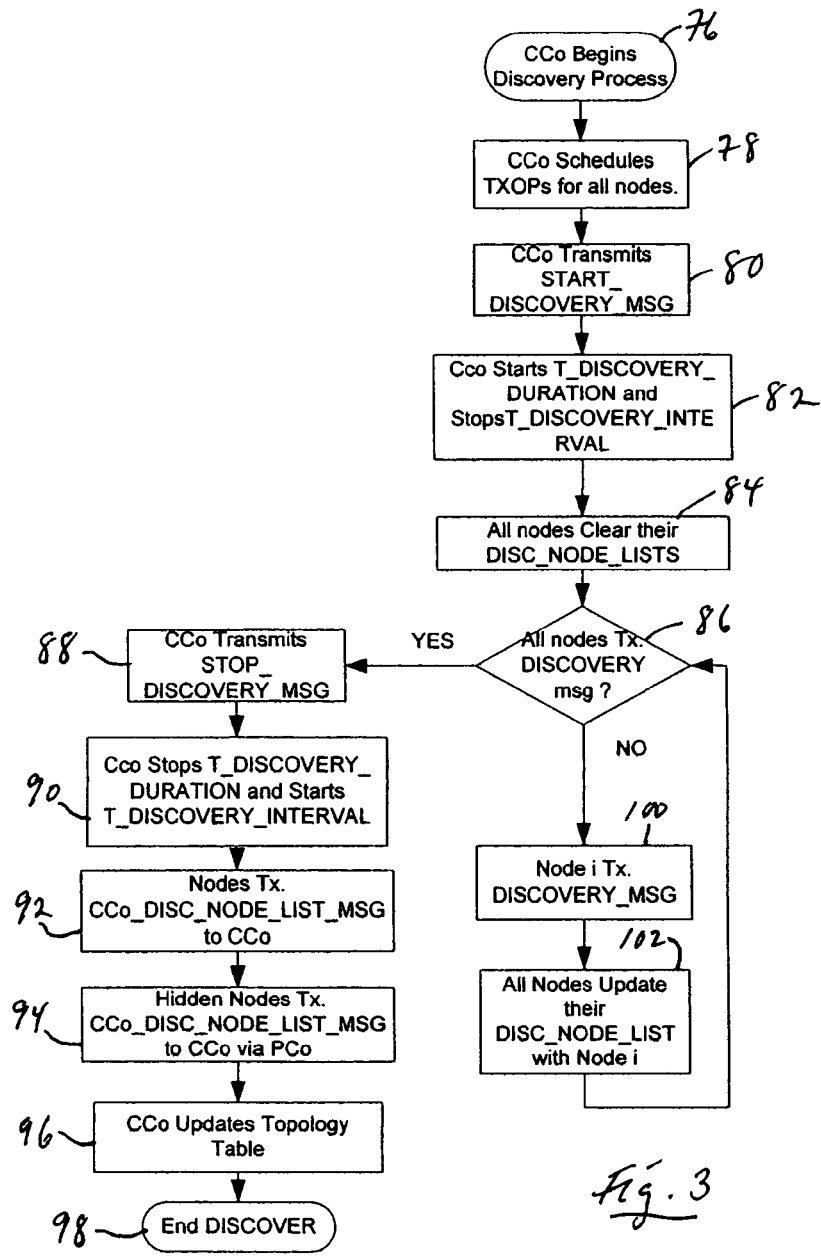
FIG. 3 is a block/schematic diagram showing a full network organization resulting from practice of the invention.
Figure 4:
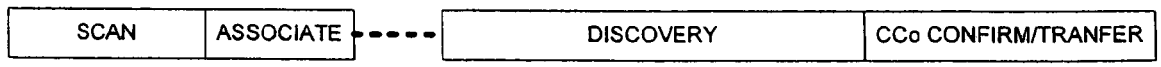
FIG. 4 provides a high-level block/diagram illustrating steps involved in the practice of the invention.

Shifting reference now, as appropriate, to FIGS. 2-11, inclusive, FIGS. 2 and 3 include different operatively interconnected blocks which help to describe the structure and operation of the present invention. How these blocks interrelate will become apparent in the descriptive text which follows. FIG. 2 specifically shows an arrangement of fifteen blocks 46-74, inclusive (even numbers only), and FIG. 3 shows an arrangement of fourteen blocks 76-102, inclusive (also even numbers only).

In the SCAN AND ASSOCIATE algorithmic portion of practice of this invention, as illustrated in FIG. 2, the procedure begins with the operations of blocks 46, 48. Block 52 then questions whether a beacon is received during a time interval determined by block 50. It the answer is YES, control passes through blocks 70, 72 to identify a contention period, and to communicate and register with the CCo, and thence to block 74 for normal network operation.

If the block 52 question is answered with a NO, control passes to block 50, wherein a determination is made regarding whether the T_SCAN period implemented by this block has expired. If the answer to this inquiry is YES, control passes to block 54, by way of which the relevant node declares itself to be the CCo, and thence performance transfers to OPERATE block 74.

If the answer to the block 50 question is NO, control passes to another inquiry block 56 which asks whether a DISCOVERY_MSG message has been received. If NO, control loops back, as shown, to block 48. If YES, seriatim behaviors of blocks 58, 60, 62, 64, 66, 68 take place in accordance with the respective labelings of those blocks, and from there, operation is handed off to OPERATE block 74

Describing the discovery aspect of practice of the present invention in terms of how this is pictured in FIG. 3, activity begins with block 76. From block 76, control and behavior pass to and through blocks 78, 80, 82 and 84 with respect to which the several respective operations described in the labeling of these blocks take place.

From block 84, control is handed to inquiry block 86 which addresses the question "All nodes Tx DISCOVERY msg?". If the answer is NO, operation passes through blocks 100, 102 in a return loop to block 86. The labeling provided for blocks 100, 102 in FIG. 3 clearly describes their respective behaviors.

If the answer to the block 86 query is YES, the discovery process heads toward a finish in block 98 via blocks 88, 90, 92, 94 and 96, in that order. Here too, labeling in these concatenated algorithmic blocks fully describes what they respectively do.

In different stages, different processes in CNOA allow nodes to register with the CCo and join the network, allow the CCo to determine the topology of the network in conjunction with the other nodes, and allow the CCo to confirm its role, or to transfer CCo functions to another node if required. These stages are shown in left-to-right sequential order in FIG. 4.

Looking still specifically at FIGS. 2 and 3, the following narrative describes algorithmically what is shown in these two figures. References to contents of these figures is made principally to the text contained therein. The terms "node" and "device" are used interchangeably.

SCAN and ASSOCIATE: When a node first wishes to join the network, it listens for a period of time specified by the timer T_SCAN. If the node does not receive a BEACON message from a CCo, or a Proxy BEACON message from a designated proxy node, the node declares itself to be the CCo, and begins controlling the activities of all other nodes, and their access to the network medium. If it hears a BEACON, the node communicates with the CCo directly or through an intermediary node, and registers in the network.

DISCOVER: The CCo periodically initiates a node discovery process. Every known node is allowed to transmit a DISCOVER_MSG message in a contention free mode, using an allocation (frequencies and time slots) granted by the CCo. The DISCOVER_MSG can simply contain the MAC address/TEI (Temporary Equipment Identifier) of the source device, or it may also contain the Frame number and time slots for future contention periods that follow the end of the Discovery interval. Every other node listens to these DISCOVER_MSG transmissions and updates its DISCOVERED_NODE_LIST. This list is a structure maintained by every node which contains the identities (MAC addresses or TEIs) of the other nodes that the node can hear. "Hidden" nodes communicate with any Proxy node they hear via the Contention Access intervals advertised in the DISCOVER_MSGs. Every node then conveys its DISCOVERED_NODES_LIST to the CCo with a message similar to CCo_DISCOVERED_NODE_LIST_MSG. The CCo maintains the resulting TOPOLOGY_TABLE.

CONFIRM CCo/Organize network: The CCo then organizes the network in relation to knowledge reflected in the topology table. The message CCo_NETCONFIG_MSG is then broadcast to all nodes. A new CCo might be chosen and this message will inform the network of the identity of the new CCo, along with any new hidden nodes and new Proxy Coordinators. In case of a transfer of CCo functions, the old CCo might transfer much information to the new CCo including the current Topology Table, the current active allocations and Frame Configuration, and coordinate timing of the handover (frame when transfer is completed, etc.).

The messages and data structures used by the CNOA algorithm are now described. BEACON_MSG This is a message transmitted by the CCo periodically. The time interval between two successive transmissions of this message is fixed. The BEACON message MUST carry the identity of the device transmitting the message.

START_DISCOVERY_MSG

This message is transmitted by the CCo to demarcate the beginning of a DISCOVERY period. The message may be included within a BEACON_MSG. Following the receipt of this message, nodes prepare to broadcast a DISCOVERY_MSG using an allocation made by the CCo for transmission of this message. This message also contains the allocations (Frame Number, Time Slots) for Contention Channels that will follow the end of the topology discovery period. This message must also indicate whether the nodes must transmit a shortened form of the DISCOVERY_MSG.

STOP_DISCOVERY_MSG

This message is transmitted by the CCo to announce the end of a DISCOVERY period. This message may be included within the BEACON_MSG. Following the receipt of this message, nodes communicate their DISCOVERED_NODE_LISTS to the CCo by using allocations made by the CCo to the individual nodes for this purpose.

DISCOVERY_MSG

This message is broadcast by each node as a part of the DISCOVERY process. The message contains the MAC address or TEI of the transmitting device. The message also contains the allocations for Contention Channels that will follow the end of the topology discovery period. This information is derived by the node from the START_DISCOVERY_MSG. This information allows hidden nodes, i.e., nodes that cannot hear the CCo but can hear one of the DISCOVERY_MSG messages, an opportunity to communicate with the device transmitting the discovery message, and the CCo through that device. An Activity Indicator is an optional parameter indicating how busy a device is, in terms of its duty cycle. If a device is not transmitting or receiving data this value is 0. The architecture, or format, of a discovery message is shown in FIG. 5.

DISCOVERY_MSG_SHORT

During the discovery process, nodes may only advertise their own identities. This allows nodes that already belong to the network to determine their connectivity within the network. It does not allow hidden nodes the opportunity to join the network, or to take part in the DISCOVERY process. This option is chosen when the CCo is not interested in optimizing coverage by enabling access to the network for Hidden Nodes. The START_DISCOVERY_MSG must indicate which form of the DISCOVERY_MSG is to be transmitted by the nodes. The format of such an abbreviated discovery message is pictured in FIG. 6.

CCo_DISCOVERED_NODE_LIST_MSG

This message is transmitted by all nodes to the CCo at the end of the DISCOVER process. TEI is a temporary equipment identifier that is known to the CCo instead of the MAC Address. Device Class Present Field is a YES or NO indicator used to indicate whether the Device Type or Class is present in the Discovered Node List. FIG. 7 shows the architecture of a CCo_DISC_NODE_LIST_MSG message.

CCo_NETCONFIG_MSG

This message is transmitted by a new device that has been selected as the CCo, or by the current CCo itself, after network organization is completed. The format of this message is shown in FIG. 8. The CCo_NETCONFIG_MSG message confirms the identity of the CCo, and informs the network of the identities of those nodes that have been designated as Proxy Nodes by the CCo, as well as the identities of the Hidden Nodes that will be served by each Proxy Node.

CCo_NETCONFIG_MSG_SHORT

This is an abbreviated form of the CCo_NETCONFIG_MSG message. This message is used when only the identity of the CCo is broadcast to all nodes in the network at the end of the DISCOVER process. FIG. 9 illustrates the make-up of this message.

DISCOVERED NODE LIST

The Discovered Node List is a data structure that contains the MAC Addresses of all the nodes discovered as a part of the discovery process. The list may optionally contain the Device Class/Type of each of the discovered nodes on the list.

Topology Table

The topology table of the CCo, say Node A, in FIG. 1, is a tabulation of the DISCOVERED_NODE_LISTS for all nodes that have associated with the network, either as hidden nodes or as nodes that are a part of the main network. An example of a TOPOLOGY_TABLE derived from FIG. 1 is shown in FIG. 10

The topology table for Node A consists of its own discovered nodes list (A, B, C) in the first column. Since Node A is also the CCo, this node maintains the Discovered Node Lists of the Hidden Nodes (D, E) as well. The rows in this table correspond to the discovered node lists received from each of these nodes. For example, the DISCOVERED_NODE_LIST of Node A is (A, B, C). That of Node C is (A, B, C, D, E).

The table of FIG. 10 has been constructed further to illustrate that it may be possible that node B can hear node C, but that node C might not be able to hear node B. This implies that the link between nodes B and C is not operational in both directions (i.e., is non-bi-directional) and hence is not a valid link. This condition is illustrated by (X) in the Discovered Node List from node B in Node A's Topology Table. Node B does show up in node C's list.

The TOPOLOGY_TABLE may also keep track of the Device Class of each node that has been discovered if such a scheme is implemented by the system. Additional information, such as the quality/capacity of each link, may also be maintained in each entry for the Discovered Node List.

Timers in CNOA

The timers required for the various states are system parameters (global variables) that may be adjusted by the CCo. Default values are recommended for T_SCAN that may be used by nodes joining the network for the first time. The following are the timers.

1. T_SCAN: This is the duration of time a node spends listening to the medium for a BEACON message. T_SCAN must be greater than T_DISCOVER_INTERVAL and T_FRAME.

2. T_FRAME: This is the length of a time frame as designated by the CCo. (time interval between two successive frames).

3. T_DISCOVERY_INTERVAL: This is the time interval between two successive Discovery periods. Since the Discovery process adds overhead and consumes bandwidth, it is desirable to limit how often the CCo schedules discovery periods. However, the CCo MUST schedule these periods often enough to allow hidden nodes to join the network and for the network to update its topology.

4. T_DISCOVERY_DURATION: This is the time duration between the transmission of the START_DISCOVERY message by the CCo and the STOP_DISCOVERY_MSG by the CCo.

SCAN and ASSOCIATE

The organization of blocks in FIG. 2 specifically shows the steps involved in a new node joining the network. In the absence of a CCo, if the node does not receive a BEACON message (block 52) for a duration of time >T_SCAN (block 50), the node declares itself to be the CCo.

If the node receives a BEACON message during the SCAN interval, the node communicates with the CCo through a Contention Channel advertised in the Beacon Message (blocks 70, 72). The node sends the CCo an ASSOCIATE request.

For nodes that cannot directly communicate with the CCo (hidden nodes), the hidden node (HN) deciphers the Frame Number and Slot Number for a contention channel from the DISCOVERY message, if it receives one such message during the SCAN interval. The HN communicates an ASSOCIATE request through the contention channel to the node that transmitted the DISCOVERY message. This node then conveys the associate request to the CCo through allocations assigned to the node by the CCo (other channels besides CCo) and requests its admission in the network.

DISCOVER

The CCo must schedule a topology discovery period at least once in a time interval specified by the timer T_DISCOVERY_INTERVAL. All nodes that have associated with the CCo, including Hidden Nodes, must participate in the DISCOVERY process. The steps in the DISCOVER process, elaborated somewhat in an earlier discussion herein, are shown in FIG. 3.

The CCo schedules transmission opportunities (TXOPs) (block 78) for all nodes in the network, including Hidden nodes, to enable them to transmit the DISCOVERY_MSG messages. The CCo informs each node of the allocation for its TXOP through the BEACON message, or through some other logical communication channel between the CCo and the nodes. The schedules for the Hidden nodes are conveyed through the proxy nodes to the hidden nodes. Alternately, the CCo may not schedule TXOPS for hidden nodes and expect them to transmit during the Contention Access intervals.

The CCo broadcasts the START_DISCOVERY_MSG. This message may be embedded in the BEACON message.

The CCo immediately, after the transmission of the START_DISCOVERY_MSG, stops the T_DISCOVERY_INTERVAL timer and starts the T_DISCOVERY_PERIOD timer.

When nodes receive the START_DISCOVERY_MSG, they must clear their DISCOVERED_NODE_LISTS in order to prevent stale topology information from persisting in the system.

Each node transmits a DISCOVERY_MSG message during its scheduled TXOP.

Every node that hears the DISCOVERY_MSG transmission updates its DISCOVERED_NODES_LIST with the identity of the source of the DISCOVERY_MSG transmission.

At the end of a time period specified by T_DISCOVERY_PERIOD, the CCo broadcasts the STOP_DISCOVERY_MSG message, conveying to all devices that the discovery period has ended and no more discovery messages are to be transmitted.

The CCo stops the T_DISCOVERY_PERIOD timer and resets and re-starts the T_DISCOVERY_INTERVAL timer.

Each node must then convey its DISCOVERED_NODES_LIST to the CCo. This is done via dedicated bandwidth allocations made to the node for this purpose by the CCo. The Hidden Nodes associated with the network must also convey their discovered node lists to the CCo via a proxy node. The CCo must make allocations for the HN-<PCo and the PCo-<CCo communications.

Note that some HNs may use the Contention Channels advertised in the DISCOVERY_MSGs to communicate an associate request to the source node transmitting the message. The node must then communicate the associate request to the CCo.

Once the CCo has received the DISCOVERED_NODE_LISTs of all nodes that are associated with the CCo, the CCo generates a TOPOLOGY_TABLE as defined earlier.

Once the TOPOLOGY_TABLE has been generated the CCo analyzes this table to organize the network.

Once the DISCOVERED_NODE_LISTS from each node has been received, and the TOPOLOGY_TABLE composed for the network, the CCo analyzes this table. This helps the CCo identify the appropriate CCo for the network, organize the network into a set of nodes that can all hear and talk to one another, separate and identify the hidden nodes, and designate suitable Proxy Coordinators (PCos) which facilitate communication between the hidden nodes and the network.

After the analysis of the TOPOLOGY TABLE, the CCo broadcasts a CCo_NETCONFIG_MSG message that advertises the identity of the chosen CCo, the identities of any Hidden nodes in the Network, and also the devices chosen to be PCos to control and communicate with the hidden nodes. The CCo schedules TXOPs for the designated Proxy Nodes to re-transmit this message for the benefit of the hidden nodes. If a transfer of CCo functions is required, the old CCo communicates with the new CCo, and communicates the TOPOLOGY_TABLE to the new CCo directly. The old CCo may also convey other system parameters to the new CCo, including the exact time reference and frame number when the new CCo should begin to transmit its first BEACON_MSG. Note that if the new CCo is an erstwhile hidden node, then such communications will have to be through the Proxy Coordinator appointed by the old CCo to communicate with the hidden node-new CCo designate.

Analysis of TOPOLOGY TABLE of FIG. 10

Let $D_A$ represent the DISCOVERED_NODE_LIST for node A, i.e. the set consisting of the identities of all nodes that A has heard.

The Topology Table for Node A is then defined as a tabulation of the DISCOVERED_NODE_LISTS for all the nodes in $D_A$ i.e., (1):

$$T_A = \{D_i\} \ \forall \ i \in D_A$$

Non-Bidirectional Link Detection

Consider two nodes, i and j. If a node i has been discovered by node j, i.e., the identity of i is an entry in the DISCOVERED_NODE_LIST of node j, but node j has not been discovered by node i, i.e., there is no entry for node j in the DISCOVERED_NODE_LIST of j, then the link between i and j is said to be non-bidirectional, (2):

For any two nodes, i and k, if i, $k \in D_i \cap D_k$ then i and k have a bidirectional link, $i<=>k$ Organization of Network A network herein is further described as the largest collection of nodes from a group of nodes that participate in the topology discovery and network organization processes, where every node in the collection can hear every other node, and can be heard by every node in the collection. This implies that all nodes in a network have bi-directional links to each other. Define (3):

$N \equiv \{i\}$, where i represents node IDs and $\forall i, j \in N$, $i<=>j$ and $|N| \geq \{$Any Collection of nodes $\{j\}$ where $\forall i, j \in N$, $i<=>j\}$ The second these two conditions in (3) is optional. One may define a network simply as any collection of nodes which are connected to each other bi-directionally. The node can determine the network N based on the above definition by examining the TOPOLOGY_TABLE and determining the set of nodes which have the properties defined in (3).

Selection of Central Coordinator CCo

Once a network has been organized, and the set N determined from the TOPOLOGY_TABLE, each node has to determine the node in N that is best suited to serve in the role of CCo. The criteria for choosing the CCo may be different. Any one or a combination of these criteria may be used in the selection of CCo. The criteria must be agreed to and known by all the nodes participating in the process.

1. Maximum Coverage: The node in the network N which supports bidirectional links with the maximum number of nodes provides the best coverage and may be deemed suitable to be a CCo. Then, by definition, (4):

$$CCo \equiv \underset{i}{\operatorname{Argmax}} |D_i| \forall\, i \in N, \text{ and for every } k \in D_i, i, k \in D_i \cap D_k$$

2. Maximum Capacity: Nodes may exchange information on the quality of the reception for each node discovered in the DISCOVERY process. This would require a common agreement among all nodes on the parameters defining the transmission of the messages in these states such as transmit power levels, modulation, coding etc. This quality indicator would convey to the transmitting node the quality of the link or communication channel between the two nodes and help the transmitter determine the best throughput (bits/sec) that may be possible on a given link or the link capacity. In the case of channels that may be time varying (on rapid time scales) the quality indicator might be less relevant in determining potential capacity of the link.

Assuming that the above method is used to determine link capacity, the node which can support the best overall throughput, defined either as the maximum of the minimum throughputs on all links to/from that node, or as the sum of throughputs of all links to/from the node, may be chosen as the CCo. The node is selected from the set N.

3. Device Class: Based on the class of each of the nodes in N, the node in N with the best capabilities or the highest class may be chosen as the CCo. Some nodes in the network may be unable to function as the CCo. The CCo must maintain Device Class or Device Capabilities information obtained at the time of association. This data must enable the CCo to determine if a device can or cannot function in the role of a CCo.

4. Lowest Duty Cycle: In the AD-HOC network, some devices can only transmit or receive any given time (half duplex operation). In such systems, it is useful to select as the CCo a node that is not busy transmitting data for its own purposes (such as a video server transmitting SDTV/HDTV). This allows the node to dedicate most of its processing resources to network control functions and more efficiently use available channel bandwidth. As a part of the DISCOVERY processes, devices may exchange parameters to indicate how busy a node is likely to be. The DISCOVERY_MSG, can have an additional parameter called ACTIVITY INDICATOR which is a percentage of time, the device is likely to spend transmitting/receiving data for purposes other than network control. The node with the lowest ACTIVITY_INDICATOR may be chosen as the CCo in conjunction with other criteria such as the coverage, class can capacity criteria defined above.

5. Combination of above factors: A combination of the above criteria may be used to determine the CCo. For example, a higher class device might get precedence over a lower class device even though the number of nodes reached by the lower class device is slightly higher. Or, a device that is not transmitting/receiving any data may have precedence over a device that is of a higher class but one that is likely to be busy transmitting its own data.

6. Order for Selection of CCo: Since there are multiple criteria by which a CCo may be appointed, the following order of precedence is proposed. If there is a tie among nodes in N for choice of CCos, the CCo may choose one of the candidate nodes at random to be the new CCo. This order of selection consideration is illustrated in FIG. 11.

Identification of Hidden Nodes

Once the TOPOLOGY_TABLE has been analyzed to define the network N, all those nodes in the topology table of the CCo that do not belong to N are declared as "hidden nodes" i.e., If node $k \in N$ then "k is a hidden node".

Identification of Suitable Proxy Coordinators With respect to the selection/designation of one or more suitable PCos, this is done preferably in such a fashion that the total number of PCos selected results in minimal "overhead" in the operation of the network, and with the ratio of communication links per PCo as high as possible. Criteria for selection of a PCo are similar to the above-listed criteria employed in the selection of a CCo.

The node that has been chosen to be the CCo examines its TOPOLOGY_TABLE to determine if there are other nodes that can best communicate with the hidden nodes also identified by examination of the table. If there exists a node, say j, that belongs to the network N and has a bidirectional link to the hidden node, say k, that does not belong to N, then that node may be designated a Proxy Coordinator or PCo i.e., $j \in N$, $k \in N$, $j<=>k$, then j is a potential PCo.

Algorithm to Determine PCo (Multiple Hidden Nodes and Multiple PCo Candidates)

In order to determine the PCos such that all possible hidden nodes are covered by a single PCo and not multiple PCos, we implement the following algorithm.

1. Let $S_{PCo}$ represent the set of Proxy Coordinator nodes.
2. For each node $k \in D_i$ for some $D_i \in T_{CCo}$, and $k \forall N$, if there exists a node $j \in N$, and $j \in S_{PCo}$, and $j<=>k$, then j is the PCo for node k.
3. For each node $k \in D_i$ for some $D_i \in T_{CCo}$, and $k \in N$, if there exists a node $j \in N$, and $j \in S_{PCo}$, and $j<=>k$, then j is designated the PCo for node k and added to the set of PCos, $S_{PCo}$.
4. For each node $k \in D_i$ for some $D_i \in T_{CCo}$, and $k \forall N$, if there DOES NOT exist a node $j \in N$, and $j<=>k$, then the hidden node k cannot be reached by any node in the network N and therefore has no PCo.

CCo Confirmation or CCo Transfer (TBD)

After the analysis of the Topology Table, the CCo may determine that another device is best suited to perform the role of CCO and may transfer the functions of CCo to this device. The transfer of the role of CCo may also be required when the current CCo fails or needs to shut down. The information transferred will include a. TOPOLOGY TABLE
b. List of associated devices
c. List of allowed devices
d. List of Active Allocations
e. Frame Configuration
f. Frame number when transfer of CCo operations will be active.
g. Other Thus, a unique algorithmic methodology is provided by the present invention for the self-organization of a centralized plural-node, bi-directional communication network. Based upon the assumption that the organized network is to have a central controller node (CCo), all nodes, at the time of initial network organization, engage in a non-transmission listening period to assess whether, in fact, there then exists (or does not exist) a pre-established CCo. Where no such pre-established CCo exists, the first node to transmit after the conclusion of the listening period declares itself to be the CCo.

Following this, a process for the discovery of network topology is invoked, and by way of this process, the various nodes which are candidate members of the network to be formed learn (a) of each other's presence, (b) of device (node) capabilities, and (c) of the qualities of communications links between the nodes. At the topology discovery conclusion, the self-appointed CCo has a available a global knowledge of these matters, and from this knowledge builds a global connectivity database in the form of a topology table.

As a part of the topology discovery and topology table-building processes certain important, differentiated categories of nodes are identified, and in relation thereto, certain specialized tasks and roles are assigned in accordance with these differing identities. Included in these categories are nodes which are referred to (a) as non-hidden nodes, (b) as hidden nodes, and (c) as proxy nodes. A non-hidden node is one which (1) cannot communicate directly with the designated CCo, (2) may not be able so to communicate either directly or bidirectionally with other nodes, and (3) thus requires special accommodation in order to be included as a part of an established, fully bi-directionally capable network.

Such accommodation is provided by the unique designation of proxy nodes which act as surrogates, or intermediaries, that effectively "obviate" the otherwise isolated statuses of the hidden nodes by acting as communication bridges disposed in paths created between hidden nodes and those other nodes, such as the CCo, with which direct communication, and/or bidirectional communication, has been "discovered" initially not to be possible.

With a network thus self-established from "initial" conditions, the appropriateness of the CCo for its controller role is evaluated, and as a consequence of this evaluation, a new CCo may be selected.

Topology discovery, topology table building; node role-assignments, including CCo role assignment, are re-engaged whenever any one of certain "change events", such as the entry of a new mode, the occurrence of a network "interruption", the effective shut down of the current CCo, occurs.

Accordingly, while a preferred organization, and manner of practicing, the invention have been illustrated and described herein, I recognize, as will those skilled in the art, that variations and modifications may be made without departing from the spirit of the invention.

I claim:

1. A method for the topology-discovery and organization of a plural-node communication network comprising
    selecting a central coordinator node (CCo) from a collection of nodes initially lacking a CCo,
    thereafter employing the selected CCo to conduct a procedure for discovering, from the mentioned collection of nodes, all nodes which are optimally capable of being organized into a network, wherein all such discovered capable nodes may effectively be organized to communicate with all other nodes, and
    with respect to such discovered, capable nodes, creating a network-global connectivity database in the form of a network-organizing communication topology table that describes enablement of bidirectional communication between all nodes, and
    at a point in time which follows initial creation of the mentioned topology table, conducting an exercise to confirm the appropriateness of the currently selected CCo, and if such appropriateness is not confirmed, to perform a transfer of CCo responsibilities from the current CCo to a newly selected CCo.

2. The method of claim 1, wherein the discovering procedure includes discovering both non-hidden and hidden nodes.

3. The method of claim 2, wherein the discovering procedure further includes discovering suitable proxy nodes which are non-hidden nodes, and which will stand as CCo surrogates for communication between the CCo and selected hidden nodes, and will do so in a manner whereby all hidden nodes can effectively communicate with the CCo.

4. The method of claim 3 which further includes enabling communication between the CCo and each hidden node via an intermediary proxy node.

5. A method for self-organizing, from a group of nodes, a centralized communication network where the group initially lacks a central coordinator node (CCo) comprising
    engaging initially in a nominally non-transmission listening-mode period to detect the presence of a beacon,
    following the listening-mode period, if no beacon has been detected, allowing an initial transmission-mode period wherein the first node to transmit declares itself to be the CCo, and
    after such a declaration, organizing the group of nodes into a network reflected by a topology table wherein each node can effectively communicate with every other node, said organizing including, engaging in a discovery-mode period wherein each node creates a disconnected-node list which it communicates to the CCo, and the topology table is constructed on the basis of such communicated discover-node lists.

6. The method of claim 5, wherein enabled node-to-node communication is bi-directional.

7. The method of claim 5, wherein said organizing includes admitting to the network both non-hidden and hidden nodes, and establishing, from the collection of non-hidden nodes, a proxy node intermediate each hidden node and the CCo.

8. The method of claim 5, wherein, at a point in time which is after the time of performing the process of organizing, the status of the then self-declared CCo is subject to a process of confirmation.

9. A method for organizing, from a group of nodes, a communication network based upon the assumption that the organized network will include a central coordinator, and in a setting wherein each node in the group has topology knowledge regarding (a) the identities of all other nodes in the group, and (b) the respective qualities of communication links that directly exist between different ones of these nodes, said method comprising performing an analysis of such topology knowledge to identify the most appropriate candidate node to perform, in at least the immediate future, the role of a central coordinator node, and following said performing, collectively engaging plural nodes in the group in the selection of that candidate node to be the then-designated central coordinator node, said engaging in selection including a Device Class criterion which is applied to determine which node in the network possesses the highest class among the nodes.

10. The method of claim 9, wherein the activity involving selection further includes a Maximum Coverage criterion which is applied to determine the node in the network which supports bi-directional links with the maximum number of nodes.

11. The method of claim 9, wherein the activity involving selection further includes a Maximum Capacity criterion which is applied to determine the node in the network which exhibits the most desirable throughput characteristics.

12. The method of claim 9, wherein the activity involving selection further includes a Lowest Duty Cycle criterion which is applied to determine the node in the network which is characterized with having the highest percentage of time available for attending to network control functions.

13. The method of claim 9, wherein the activity involving selection further includes a combination of plural criteria selected from the list including (a) Maximum Coverage, (b) Maximum Capacity, (c) Device Class, and (d) Lowest Duty Cycle.

14. A network method for self-organizing a group of nodes into a communication network where the nodes are all operatively connected to a shared communication medium, certain nodes may be hidden nodes, and there is an initial assumption that there is no central coordinator node, said method comprising engaging in a discovery process to identify the qualities of direct and indirect internodal communication capabilities, and as a consequence of said engaging, establishing, as desired, at least one proxy node to facilitate bi-directional communication with any hidden nodes, said establishing employing the following algorithm:

1. Let $S_{PC_o}$ represent the set of Proxy Coordinator nodes,
2. For each node $k \in D_i$, for some $D_i \in T_{CC_o}$, and $k \notin N$, if there exists a node $j \in N$, and $j \in S_{PC_o}$, and $j <=> k$, then $j$ is the PCo for node $k$,
3. For each node $k \in D_i$, for some $D_i \in T_{CC_o}$ and $k \notin N$, if there exists a node $j \in N$, and $j \notin S_{PC_o}$, and $j <=> k$, then $j$ is designated the PCo for node $k$ and added to the set of PCos, $S_{PC_o}$.
4. For each node $k \in D_i$ for some $D_i \in T_{CC_o}$, and $k \notin N$, if there DOES NOT exists a node $j \in N$, and $j <=> k$, then the hidden node $k$ cannot be reached by any node in the network N and therefore has no PCo.

* * * * *